US010669166B2

(12) United States Patent
Liao et al.

(10) Patent No.: US 10,669,166 B2
(45) Date of Patent: *Jun. 2, 2020

(54) UV-LED LIQUID MONITORING AND TREATMENT APPARATUS AND METHOD

(71) Applicant: LARQ Inc., Foster City, CA (US)

(72) Inventors: Yitao Liao, Hayward, CA (US); Robert C. Walker, Hayward, CA (US); Doug Collins, Hayward, CA (US); Wei Zhang, Hayward, CA (US)

(73) Assignee: LARQ INC., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/299,023

(22) Filed: Mar. 11, 2019

(65) Prior Publication Data

US 2019/0202715 A1 Jul. 4, 2019

Related U.S. Application Data

(63) Continuation of application No. 15/186,342, filed on Jun. 17, 2016, now Pat. No. 10,227,241, which is a
(Continued)

(51) Int. Cl.
C02F 1/32 (2006.01)
C02F 1/00 (2006.01)
(Continued)

(52) U.S. Cl.
CPC ............ C02F 1/325 (2013.01); A23L 3/28 (2013.01); C02F 1/008 (2013.01); A23L 2/50 (2013.01);
(Continued)

(58) Field of Classification Search
CPC .. C02F 1/00; C02F 1/001; C02F 1/008; C02F 1/004; C02F 1/325; C02F 1/725;
(Continued)

(56) References Cited

U.S. PATENT DOCUMENTS 6,182,453 B1 * 2/2001 Forsberg ............. B01D 5/0072
62/125
6,447,721 B1 * 9/2002 Horton, III ............... A61L 2/10
210/748.11

(Continued)

FOREIGN PATENT DOCUMENTS

| CN | 102557350 A | 7/2012 |
| CN | 104768876 A | 7/2015 |
| CN | 105121357 A | 12/2015 |

Primary Examiner — Robert Clemente
Assistant Examiner — Akash K Varma
(74) Attorney, Agent, or Firm — Snell & Wilmer L.L.P.

(57) ABSTRACT

A storage container includes an input portion for receiving and filtering a source liquid to form an output liquid, a storage portion for storing the filtered liquid, and a base portion disposed below the storage portion including a UV light source for providing transmitted UV light to the filtered liquid, a UV light detector disposed an optical path length away from the UV light source for detecting received UV light through the filtered liquid in response to the transmitted UV light, a processor for determining an absorption or a transmission percentage in response to the transmitted UV light and the received UV light, for determining a safe condition, in response to the absorption or the transmission percentage respectively not exceeding or exceeding predetermined criteria, and one or more indicators for indicating that the liquid is safe for consumption to a user, in response to the safe condition.

20 Claims, 11 Drawing Sheets

Related U.S. Application Data continuation-in-part of application No. 14/672,077, filed on Mar. 27, 2015, now Pat. No. 10,214,431, and a continuation-in-part of application No. 14/943,628, filed on Nov. 17, 2015, now abandoned.

(60) Provisional application No. 62/187,169, filed on Jun. 30, 2015.

(51) Int. Cl.
| | |
|---|---|
| *A23L 3/28* | (2006.01) |
| *A23L 2/50* | (2006.01) |
| *C02F 1/28* | (2006.01) |
| *C02F 101/12* | (2006.01) |
| *C02F 101/30* | (2006.01) |
| *C02F 101/32* | (2006.01) |

(52) U.S. Cl.
CPC ............ *A23V 2002/00* (2013.01); *C02F 1/001* (2013.01); *C02F 1/283* (2013.01); *C02F 2101/12* (2013.01); *C02F 2101/30* (2013.01); *C02F 2101/306* (2013.01); *C02F 2101/32* (2013.01); *C02F 2201/009* (2013.01); *C02F 2201/326* (2013.01); *C02F 2201/3222* (2013.01); *C02F 2201/3224* (2013.01); *C02F 2201/3227* (2013.01); *C02F 2201/3228* (2013.01); *C02F 2209/006* (2013.01); *C02F 2209/008* (2013.01); *C02F 2209/02* (2013.01); *C02F 2209/06* (2013.01); *C02F 2209/11* (2013.01); *C02F 2303/04* (2013.01); *C02F 2305/10* (2013.01); *C02F 2307/02* (2013.01); *C02F 2307/04* (2013.01); *C02F 2307/08* (2013.01); *C02F 2307/10* (2013.01); *Y02A 20/212* (2018.01); *Y02W 10/37* (2015.05)

(58) Field of Classification Search
CPC ........ C02F 1/72; C02F 1/32; C02F 2201/008; C02F 2201/009; C02F 2201/3222; C02F 2201/3227; C02F 2201/326; C02F 2209/001; C02F 2209/003; C02F 2209/008; C02F 2209/08; C02F 2209/11; C02F 2209/15; C02F 2209/20; C02F 2209/21; C02F 2209/36; C02F 2303/04
USPC .......................................................... 210/93
See application file for complete search history.

(56) References Cited

U.S. PATENT DOCUMENTS

| | | | |
|---|---|---|---|
| 7,169,311 B2* | 1/2007 | Saccomanno | A61L 2/10 210/198.1 |
| 7,550,746 B2 | 6/2009 | Tokhtuev et al. | |
| 2002/0130069 A1* | 9/2002 | Moskoff | C02F 1/008 210/85 |
| 2014/0054222 A1 | 2/2014 | Clark et al. | |
| 2015/0158741 A1* | 6/2015 | Lee | C02F 1/003 210/184 |

* cited by examiner

UV-LED LIQUID MONITORING AND TREATMENT APPARATUS AND METHOD

CROSS-REFERENCE TO RELATED APPLICATIONS

The present invention is a continuation of and claims priority to U.S. patent application Ser. No. 15/186,342 filed on Jun. 17, 2016, now issued as U.S. Pat. No. 10,227,241 on Mar. 12, 2019, and is a continuation in part of and claims priority to U.S. patent application Ser. No. 14/672,077 filed Mar. 27, 2015, now issued as U.S. Pat. No. 10,214,431 on Feb. 26, 2019. U.S. patent application Ser. No. 15/186,342 is also a continuation in part of and claims priority to Ser. No. 14/943,628 filed Nov. 17, 2015, which claims priority to U.S. Patent application No. 62/187,169 filed Jun. 30, 2015. These applications are incorporated by reference herein, for all purposes.

BACKGROUND OF THE INVENTION

The present invention relates to liquid monitoring. More specifically, embodiments of the present invention relate to a UV-LED liquid monitoring and purification systems and methods of operation.

Water suppliers periodically monitor water quality at centralized locations, such as water treatment plants, pump stations, and the like. The periodic testing is used to check whether the provided water meets certain health quality standards.

The inventors of the present invention believe that there are drawbacks to centralized testing systems including that water delivered to the end point (consumer), e.g. home, apartment, factory, or the like, may not have the same quality as provided by the supplier. Reasons for this deterioration in quality may include contamination within the distribution network (e.g. leaky pipes, pollution, sewage contamination, etc.); contamination within an end point (e.g. leaky pipes within a factory, chemicals leached from pipes, etc.); and the like. Another drawback is believed to be because water quality is not always monitored in real-time, contaminated water may be provided to consumers for some time, before the contamination is discovered.

From the above, it is desired to have a distributed water quality monitoring and treatment system without the drawbacks described above.

BRIEF SUMMARY OF THE INVENTION

The present invention relates to liquid treatment. More specifically, embodiments of the present invention relate to a UV-LED liquid treatment system and methods of operation. In various embodiments, the liquid may be water (e.g. tap water, bottled water, etc.), a fruit juice (e.g. orange juice, apple juice, cranberry juice, etc.), an electrolyte (e.g. Gatorade, etc.), a flavored water (e.g. soda, etc.), a soup base, or the like. For sake of convenience, embodiments described herein are directed to water, however, it should be understood that many other types of liquid may be treated, as described herein.

Various embodiments of the present invention include a water purification system (e.g. a water bottle, a water dispenser, an in-house water treatment system, or the like) that uses a combination of ultraviolet LEDs to kill bacteria, viruses, and spores in the incoming water. Optionally, the system includes TiO2 (Titanium Dioxide), or H2O2 (Hydrogen peroxide) to work with UV LEDs to purify water via production of reactive oxygen species via a photo catalytic oxidation process. In general, it is contemplated that unsanitary water may include water of unknown-safety, pathogen-bearing water, or other types of liquid that if consumed by a human (or other animal) could cause illness and/or death. Additionally, the unsanitary water may also include one or more chemicals (e.g. metals, volatile organic chemicals and pesticides).

In various embodiments, a system may include some or all of the following elements: a) water analysis module, b) a physical/chemical water treatment portion, c) a UV treatment portion, d) a reservoir portion d) a communication portion, e) a filtration module, f) battery module and g) driver electronics. Some systems are used to monitor and treat water incoming to a residence, facility, or the like (e.g. water treatment unit), or treat water prior to consumption or use (e.g. water pitcher or a water bottle). In some embodiments, water quality analysis is performed upon incoming water to a user. The water quality may be analyzed for chemical contaminants and/or pathogens; the water quality may be analyzed for optical transparency and/or optical absorption; the water quality may be analyzed for optical spectroscopy and/or florescence spectroscopy. In various embodiments, the water quality may also be analyzed before and after treatment. Water purification may be performed upon the water. The purification may include filtering of suspended particulates, removal or break down of chemical impurities, and/or destruction of pathogens (e.g. bacterial or viral). In some cases the purification may be tailored to the impurities that were just determined. In various embodiments, an additional analysis may be performed upon the purified water. The initial analysis of the incoming water and/or the final analysis of the treated water may be sent via the communication portion to a centralized reporting server, e.g. the water provider, a governmental agency, or other third party monitoring agency.

In various embodiments, a communication portion may include a communication system based upon Bluetooth, WiFi, 4G, 3G, NFC, RF, Ethernet, or the like. The communication portion may directly communicate to a cloud-based reporting server via WiFi, 4G, 3G, Ethernet, or the like. In other embodiments, the communication portion communicates via Bluetooth, NFC, IR, ZigBee or other rf protocol to a smart device (e.g. smart phone, home PC, home server, or the like) having one or more specialized software applications running thereon. In various embodiments, the water data may be stored within the applications, processed and viewed by the user on the smart device. For example, the user may see time trends in the water turbidity, the types of contaminants detected in the water, and the like. In some embodiments, the data may automatically or manually uploaded to the centralized reporting server from the application. For example, the user's application may periodically upload the water quality data captured, as described herein.

In various embodiments, a centralized reporting server receives and stores water quality reports from a multitude of users in real-time or non-real time. Based upon the real-time and/or non-real time data and based upon knowledge of the water distribution network, near-real time identification of water quality problems may be determined. Causes for the water quality problems may then be investigated, and fixes to the distribution network, modifications to the outgoing water treatment, and other actions may be taken. Further, based upon knowledge of the water distribution network and the water quality reports, over time, trends in water quality may be determined. Based upon the trends, a water provider may change its water purification procedures (e.g. add additional chemical removal steps); may determine water branches having unusual contaminants, inspect the water branches, and/or repair faulty water branches; may shut-off water provided to specific branches or shut-off water from specific sources when contaminants exceed the purification capabilities; may modify conditions around aquifers and other water sources, and the like.

According to one aspect of the invention, a method for a counter-top liquid treatment device is disclosed. A technique may include determining first optical analysis data in response to input liquid provided to an input portion of the liquid treatment device, storing in a memory, the first optical analysis data and treating with a liquid treatment portion of the liquid treatment device, the input liquid to form treated liquid. A process may include determining second optical analysis data in response to the treated liquid, determining with a processor, whether the second optical analysis data exceeds or does not exceed predetermined standards data, determining with the processor, a safe signal, in response to the second optical analysis data exceeding the predetermined standards data, and outputting a first visual indication to a user that the treated liquid is safe for consumption, in response to the safe signal.

According to another aspect of the invention, a portable liquid storage container is disclosed. One apparatus includes a filtering portion configured to receive a source liquid, wherein the filtering portion is configured to filter the source liquid and to output filtered liquid; a storage portion coupled to the filtering portion, wherein the storage portion is configured to store the filtered liquid, and a base portion, disposed below the translucent storage portion. A base portion may include a UV light source configured to provide transmitted UV light to filtered liquid stored within the storage portion, and a UV light detector, optically coupled to the UV light source and disposed an optical path length away from the UV light source, wherein the UV light detector is configured to detect received UV light in response to the transmitted UV light from the UV light source and through the optical path length of the filtered liquid. A base portion may include a processor coupled to the UV light source and UV light detector, wherein the processor is configured to determine an absorption percentage or transmission percentage in response to the transmitted UV light and the received UV light, wherein the processor is configured to determine a safe condition, in response to the absorption percentage or the transmission percentage respectively not exceeding or exceeding predetermined criteria; and one or more visual indicators coupled to the processor, wherein the one or more visual indicators are configured to output a visual indication to a user that the liquid is safe for consumption, in response to the safe condition.

Various additional objects, features and advantages of the present invention can be more fully appreciated with reference to the detailed description and accompanying drawings that follow.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
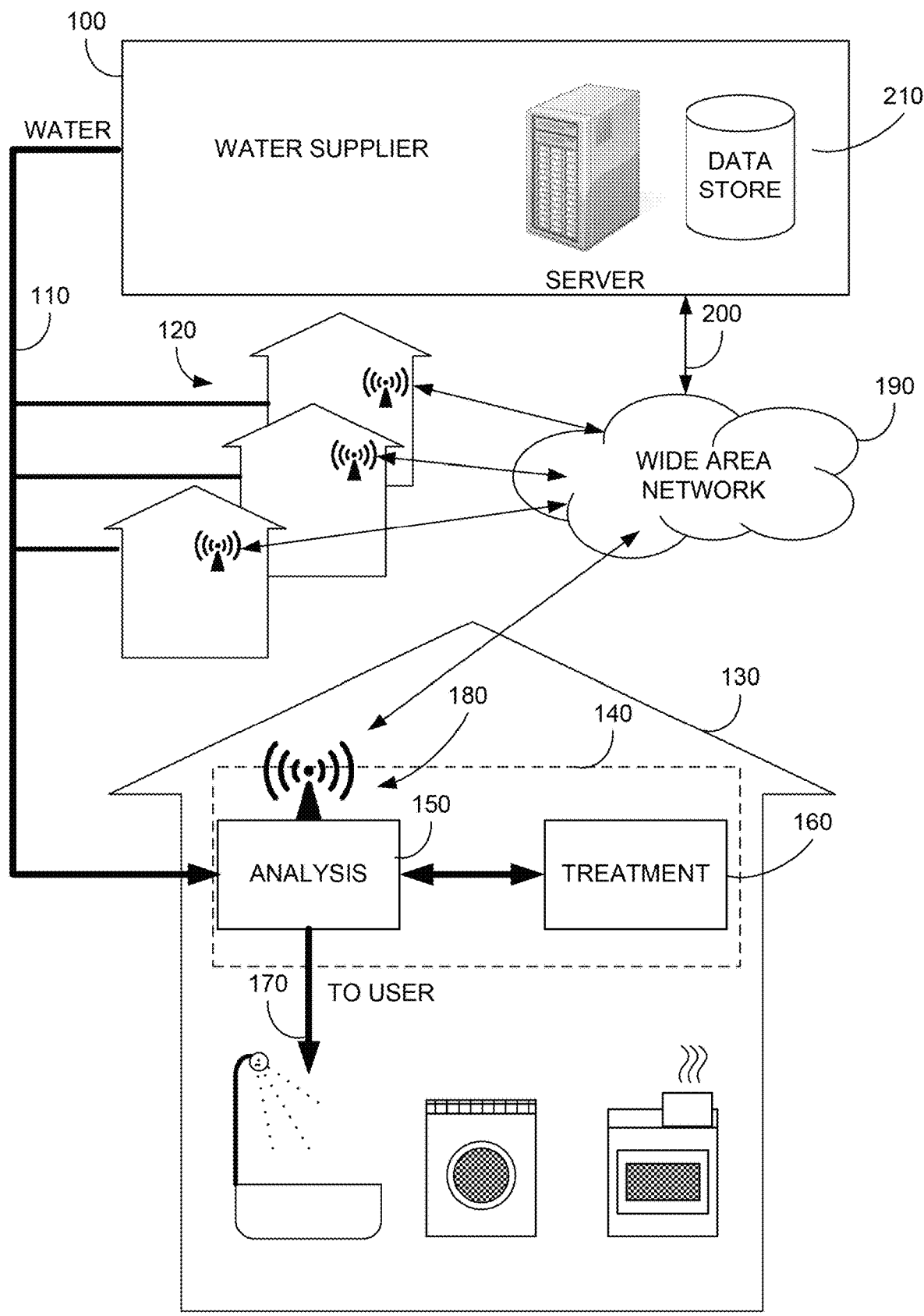
FIG. 1 illustrates a system diagram of various embodiments of the present invention.

FIG. 1 illustrates an embodiment of the present invention. More specifically, FIG. 1 illustrates a water supplier 100 supplying water 110 to water customers 120. Within a typical water customer 130, a device 140 is provided. In the present example, device 140 includes a water analysis device 150 and a water treatment device 160. As will be discussed further below, water analysis device 150 can perform an impurity analysis or optical transmittance, or optical absorbance analysis on incoming water 110, and water treatment device 160 can treat incoming water 110 and output treated water 170. Water analysis device 150 can also perform an impurity analysis or optical transmittance, or optical absorbance analysis on the treated water 170. If the treated water 170 is within predetermined impurity thresholds, it may be provided to the user, and in some embodiments, if the treated water exceeds the predetermined impurity thresholds, the treated water 170 will not be provided to the user.

In the embodiments illustrated in FIG. 1, water customers 120 each have a device 140 installed that performs the analysis and treatment functionality. As shown, each device 140 includes a wired or wireless communication portion 180 which can transmit data via a wide area network 190, back to water supplier 100. In various embodiments, the data may include an impurity analysis or optical transmittance, or optical absorbance analysis of the incoming water 110 and/or the treated water. As illustrated, the data 200 can be stored in a data store 210 associated with water supplier 100. In other embodiments, data store 210 may be associated with a third-party not associated with water supplier 100, such as a local water control agency, the EPA, a governmental body, a non-governmental organization, a commercial company, a non-profit organization, or the like.

Figure 2A:
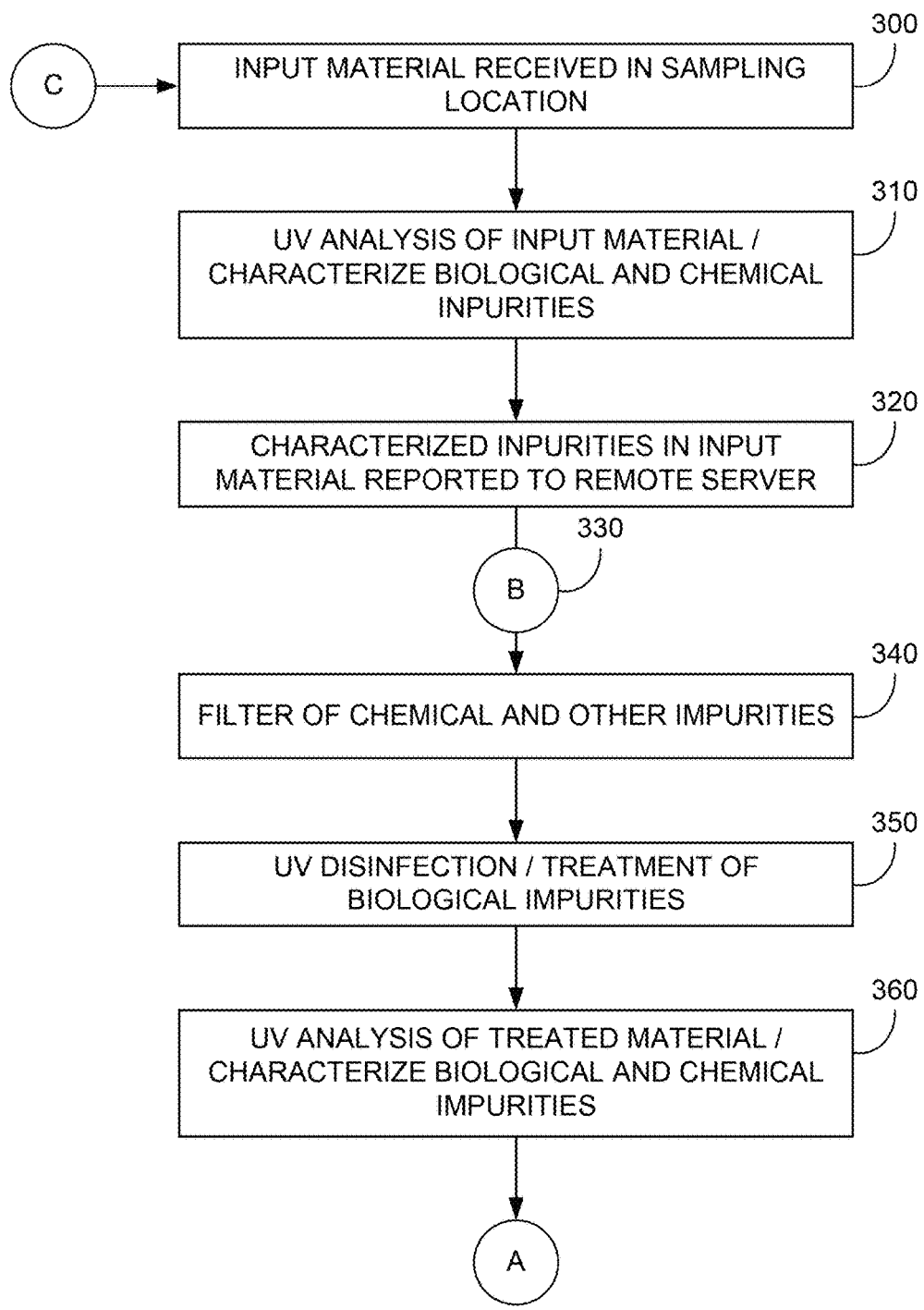
FIGS. 2A-2B illustrate a block diagram of a flow chart according to some embodiments of the present invention.
Figure 2B:
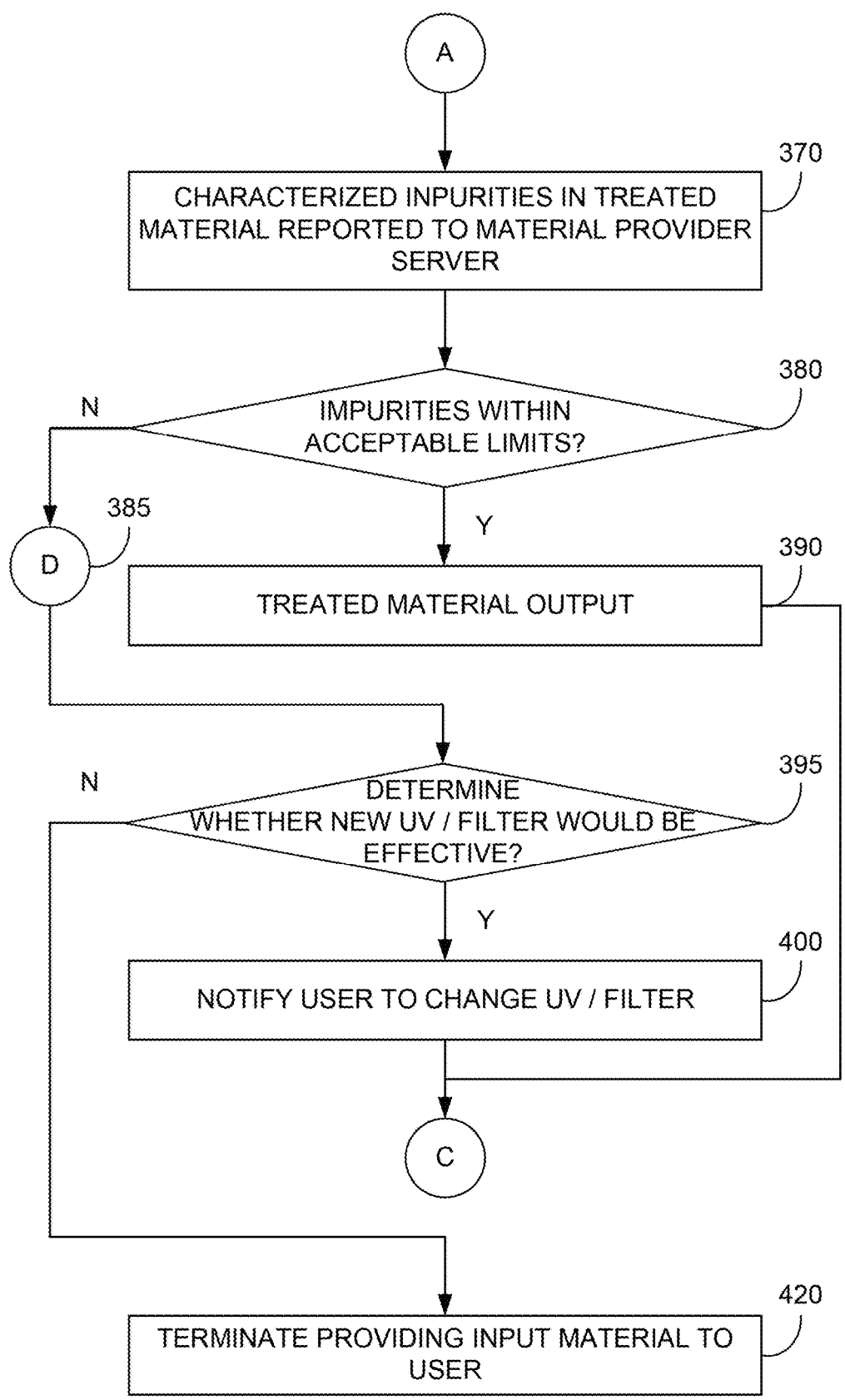

FIGS. 2A-2B illustrate a flow diagram according to various embodiments of the present invention. More specifically, FIGS. 2A-2B illustrate an example of a process performed at a typical water customer location, such as water customer 130, in FIG. 1. Initially water is provided to water customer 130, step 300. In other embodiments, water may be replaced with other fluids, such as gasoline, or other liquid, or beverage, and the customers may be companies, power plants, or the like.

In various embodiments, when device 140 receives the input water, an initial analysis can be performed, step 310 (optional). In various embodiments, one or more UV LEDs (with emission peak wavelength in the spectral range between 210 nm and 280 nm, or between 270 nm and 340 nm, or between 330 nm and 395 nm, or the like) may be used to illuminate the input water, and one or more optical sensors (such as, a photodiode, a photo detector, a spectrometer, or the like) may be used to detect responses to the UV illumination. In some embodiments, UV LEDs being developed by the assignee of the present invention may be used to illuminate the input water sample with UV light within a range of wavelengths from about 210 nm to about 365 nm, among other possible wavelengths, such as 385 nm. The UV LEDs may include some UV LEDs having a peak at about 280 nm, some UV LEDs having a peak at about 320 nm, or the like. By having multiple peaks of UV wavelengths, biological impurities having different response characteristics may be determined. For instance, different wavelength LEDs may be individually turned on by using a LED driver system that can pulse through a combination of UV LED wavelengths (frequency) peaked from 254 nm, 265 nm, 280 nm, 310 nm to 365 nm. For example, viruses may respond to a first UV LED characterized by a first UV frequency, bacteria may respond to a second UV LED characterized by a second UV frequency, and the like. In various embodiments, biological contaminants may include cryptosporidium, giardia, legionella, coliform, viruses, and the like.), or in another embodiment, contaminations can be suspended solids or particles in the water.

In response to the UV illumination, biological impurities may respond with characteristic responses. For example, pathogens that are exposed to first UV frequency light may reflect the UV frequency light, other impurities that are exposed to second UV frequency light may fluoresce, and the like. In some embodiments, the intensity of the responses as well as the wavelength are recorded.

In various embodiments, other types of testing may be performed upon the input water to determine chemical impurities (e.g. chlorine, lead, arsenic, organic compounds). For example, it is believed that methods for testing levels of lead, arsenic, and other harmful chemicals, are well-known, and can be used with embodiments of the present invention.

In various embodiments, the wavelengths of the responses to the UV illumination may be correlated to particular biological impurities, and the intensities may be correlated to the amount/percentage of the biological impurities. Further, based upon the chemical impurity analysis, the amount/percentage of the chemical impurities can be determined. The amount/percentage of the biological impurities and chemical impurities can then be sent back to the water provider, step 320, as illustrated in FIG. 1.

In some embodiments, step 310 may simply include using a UV light source to illuminate the water and a UV light detector to determining the turbidity or clarity of the water. In other embodiments, step 320 need not be performed, or may be performed at a later time.

Figure 3A:
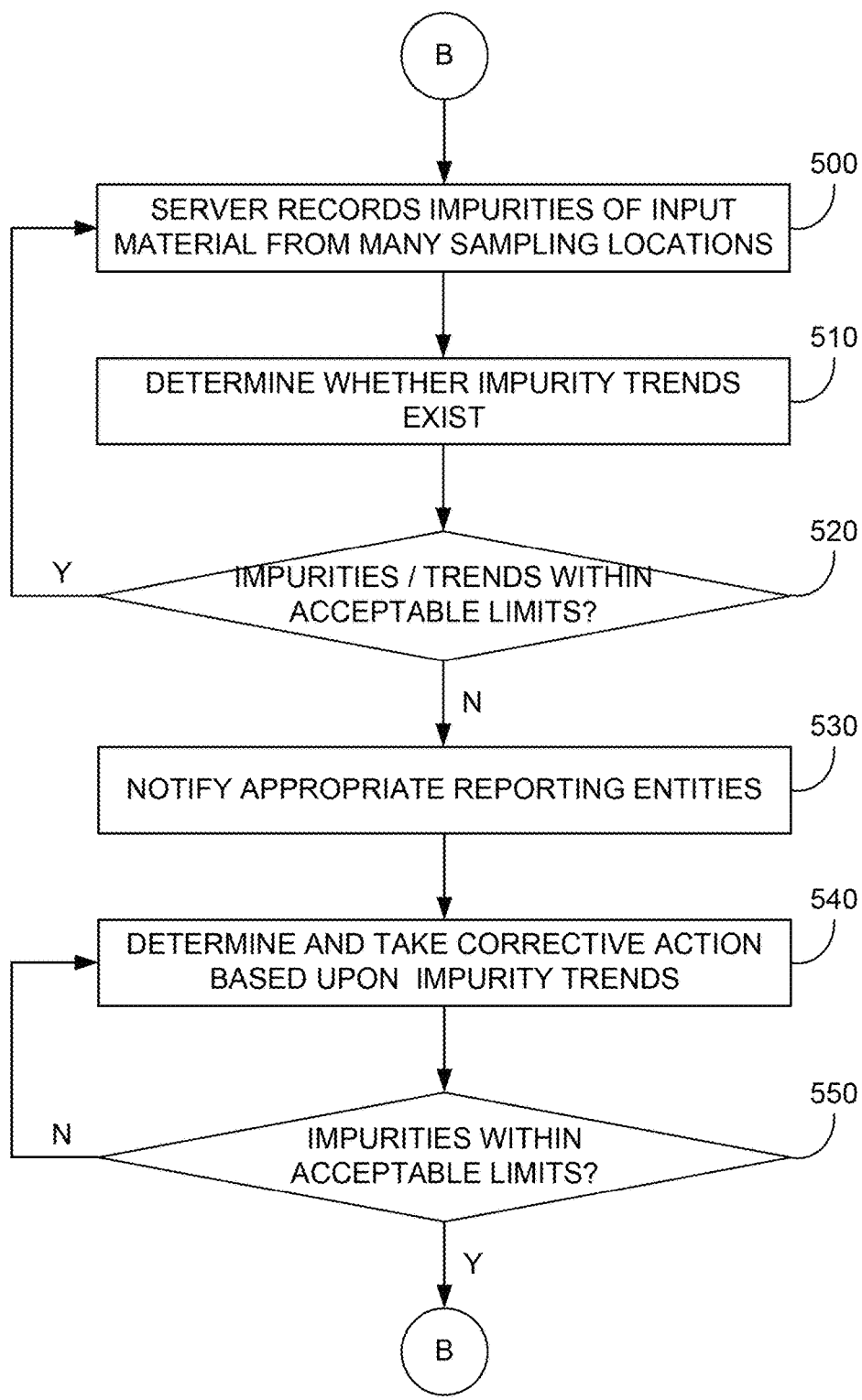
FIGS. 3A-3B illustrate another block diagram of a flow chart according to some embodiments of the present invention.
Figure 3B:
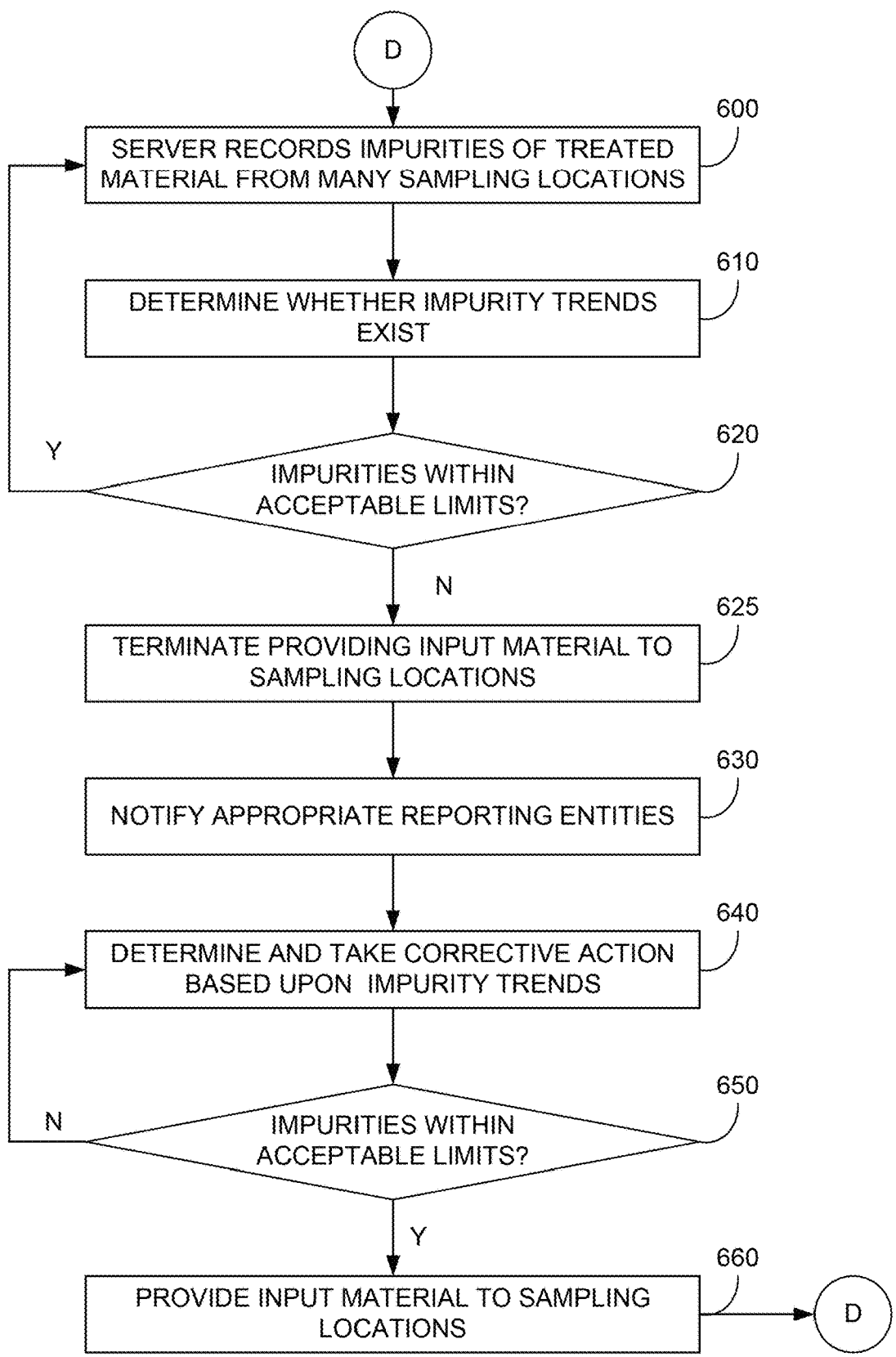

In FIG. 2A, after step 320, the processes illustrated in FIGS. 3A-3B, step 330, may be performed at the same time or at different times (asynchronously) from the remaining steps in FIGS. 2A-2B.

Next, in various embodiments, a dedicated UV disinfection/treatment process may be performed, step 350 and a dedicated filtering process may be performed, step 340. In some embodiments, the UV disinfection or treatment process may also include UV LEDs currently under development by the present assignee. For example, UV LEDs having different UV frequency peaks, e.g. 220 nm, 240 nm, 260 nm, 320 nm, 340 nm, 365 nm, 375 nm, etc. may irradiate the input water. In some embodiments, the power output or intensity of the UV LEDs may be flat across the desired UV frequency range. In other embodiments, the power output of the UV LEDs may depend upon the type of biological contaminants that were determined in step 310, above. For example, if only viruses are determined, only UV LEDs having a peak of about 254 nm may be activated in step 350.

In some embodiments, in step 350 UV irradiation of the water, or liquid, may be performed in conjunction with a catalyst, such as TiO2, as mentioned above. TiO2 is selected as a catalyst because it is non-toxic, stable, has no smell, is not soluble in water, but reacts strongly with UV light. In such embodiments, UV illumination in the UV-A bans may irradiate an inner surface, or other element in the water that has a coating of TiO2. In response to the UV-A (from about 250 to about 400, especially around 340 nm) irradiation, the TiO2 will produce one or more water byproducts, such as reactive oxygen species. It is expected that many pathogens (e.g. viruses, bacteria, fungi, algae, cancer, *E. coli*, etc.) and harmful chemicals (e.g. antibiotics, artificial dies, pesticides, herbicides, pharmaceuticals, etc.) that are exposed to active oxygen species will be neutralized. In light of the above disclosure, other catalysts can be used and are considered within the scope of embodiments of the present invention.

In various embodiments, the dedicated filtering process of step 340 may be non-selective and not dependent upon the types of chemical impurities determined in step 310, above. For example, the filtering process may include activated charcoal to absorb any chlorine or organic compound in the input water.

In various embodiments, step 340 or a similar step may be performed prior to step 310. In such embodiments, for example, characterization (UV, white light, etc.) of the water is performed after filtering out certain contaminants, impurities, suspended particles, or the like. These particles may inhibit the use of UV light for decontamination purposes, accordingly, filtering out of particulates may be performed prior to characterization. In such embodiments, step 310 may determine whether the water can be treated by UV light, or whether the water is too cloudy. If the water is too cloudy, the UV disinfection/treatment in step 350 may not be effective. Accordingly, if the water is too cloudy, in step 380 etc., below, the water may be deemed unfit for disinfection, treatment and for consumption (or other use), step 420.

In various embodiments, the treated water can again be tested for biological and/or chemical impurities, step 360. This step may be performed with the same analysis module that performs step 310, above. In other embodiments, two analyses modules may be used, one for input water and one for treated water. Various embodiments allow water to flow relatively freely from the input water, through embodiments of the present invention, and to the treated water.

Next, the analysis data on the treated water may be sent to the remote server in step 370. In some embodiments, the analysis data of the input and treated water may be sent to the remote server together in this step. As mentioned previously, the remote server may take the analysis data and perform actions asynchronously from the steps described in FIGS. 2A-2B. In some embodiments, the water analysis data maybe compared with data acquired at other user/customer locations globally, and feedback to the user/customer as indication of the local water quality.

In various embodiments, a processing module may review the analysis data of step 360 to determine whether one or more contaminants exceed a predetermined threshold for a contaminant, step 380. For example, based upon the UV analysis in step 360, it may be determined whether cryptosporidium is detected in the treated water. If not, the treated water may be allowed to flow to the user, step 390.

In various embodiments, if one or more contaminants are detected in the treated water, a notification is made to the water server, step 385, and a determination is made as to whether the UV disinfection or treatment of step 350 and filtering of step 340 should have remove the impurity, step 395. If so, a determination is made whether the UV disinfection/treatment module and/or the filtering module of steps 340 and 350 need to be replaced, step 400. If so, in step 410, the user may be directed to replace one or more of these modules, e.g. replace the activated charcoal filtering mechanism, or the like.

In some embodiments, a determination is made that the treated water is not able to be treated effectively, the water flow may be stopped, step 420. In other embodiments, the treated water may continue to flow to the user, but the user may be made aware that the treated water is not safe to drink directly out the tap. In some embodiments, one or more indicator lights may be illuminated to provide the signal to the user. In other embodiments, one or more text messages may automatically be sent to the user when the water contains unacceptable levels of impurities.

FIGS. 3A-3B illustrate various embodiments of the present invention. More specifically, the processes may be performed by a server associated material (e.g. water) supplier, a regulation agency, or other third party organization.

As was illustrated in FIG. 1, it is contemplated that multiple users have embodiments of the present invention, and these multiple perform analyses upon the incoming water (e.g. step 320, FIG. 2A), and report the results to the server in step 330, FIG. 2A. In FIG. 3A, the analyses upon the input water is received by the centralized server, step 500.

In various embodiments, the centralized server may determine whether there are any positive or negative contamination trends in the water received by users, step 510. In some embodiments, this may also be determined based upon currently received data, historical data, and/or other data previously gathered by the centralized server. In various embodiments, if the impurities/trends do not exceed certain limits, step 520, the process may return to monitoring incoming samples.

In various embodiments, when provided water exceeds the standards, notification may be sent to the water supplier management, governmental authorities, other monitoring group, water consumers, step 530. The notification may be via e-mail, text, text message, phone call, or the like. As an example, if a factory discharges a hazardous chemical into a water supply, when embodiments of the present invention located at a user's home detect the hazardous chemical, using the steps described above, Governmental authorities or the water supplier may activate an emergency notification system to automatically alert water customers that they should not use the water.

In response to determining there is a problem with the water provided to consumers, one or more corrective actions may be taken by the water supplier, step 540, until the water returns to an acceptable water quality, step 550. Many conventional methods for treat the water, prior to providing to the user, are contemplated, for example, adding additional chemicals (e.g. chlorine); shifting sources of water (e.g. from lake to well water); locating and reducing of sources of contamination (e.g. factories, agricultural run-off, sewage); and the like. Such actions may be short-range actions and/or long range actions.

As was illustrated in FIG. 1, it is contemplated that multiple users have embodiments of the present invention, and these multiple perform analyses upon the treated water (e.g. steps 340-350, FIG. 2A), and report the results to the server in step 385, FIG. 2B. In FIG. 3B, the analyses upon the input water is received by the centralized server, step 500.

In various embodiments, similar to the steps in FIG. 3A, the centralized server may determine whether there are any positive or negative contamination trends in the water received by users, step 610. In some embodiments, this may also be determined based upon currently received data, historical data, and/or other data previously gathered by the centralized server. In various embodiments, if the impurities/trends do not exceed certain limits, step 620, the process may return to monitoring incoming samples.

In various embodiments, when provided water exceeds the standards, the water supply may be automatically shut-off to one or more water customers, step 625. Additionally, notification may be sent to the water supplier management, governmental authorities, other monitoring group, water consumers, step 630. Again, the notification may be via e-mail, text, text message, phone call, or the like. As an example, if a factory discharges a hazardous chemical into a water supply, when embodiments of the present invention located at a user's home detect the hazardous chemical, within the treated water, Governmental authorities or the water supplier may activate an emergency notification system to automatically alert water customers that they should not use the water. In contrast to the process described in FIG. 3A, the focus within FIG. 3B is water that cannot be effectively treated by embodiments of the present invention.

In response to determining there is a problem with the water provided to consumers, one or more corrective actions may be taken by the water supplier, step 640, until the water returns to an acceptable water quality, step 650. In the short range, this may include replacing the water purification portions of embodiments of the present invention, at each water customer site. For example, replacing activated carbon filters, replacing particulate filters, adding additional UV light sources, and the like, step 660. Many conventional methods for treat the water, prior to providing to the user, are also contemplated, for example, adding additional chemicals (e.g. chlorine); shifting sources of water (e.g. from lake to well water); locating and reducing of sources of contamination (e.g. factories, agricultural run-off, sewage); and the like.

In various embodiments, device 140 in FIG. 1 may be embodied as a water treatment device such as a water filter in a garage or under the sink, a table top device, a water pitcher, a water bottle (e.g. sports bottle) or the like. As an example, a water pitcher or water bottle may be based upon the design described in U.S. Pat. No. 8,816,300 issued Aug. 26, 2014 and assigned to the present assignee.

Figure 4:
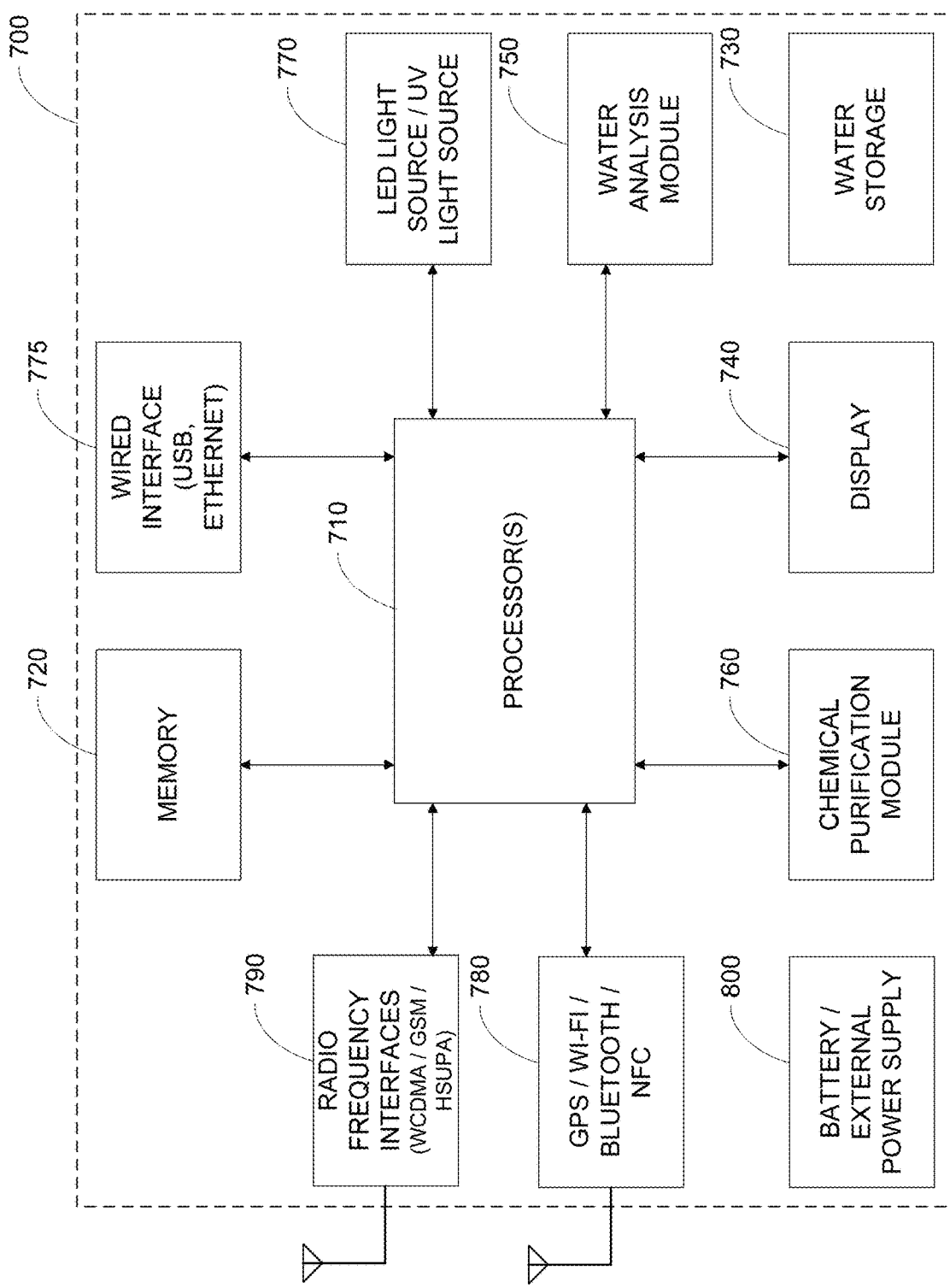
FIG. 4 illustrates a block diagram of portions of various embodiments of the present invention.

FIG. 4 illustrates a functional block diagram of various embodiments of the present invention. In FIG. 4, a device 700 typically includes an applications processor 710, memory 720, a display or other visual indicator 740, water analysis module 750, physical and chemical purification modules 760, UV purification modules 770, a treated water holding tank 730, and the like. Remote communications from and to device 700 can be provided by alternatively provided by a wired interface 775, a GPS/Wi-Fi/Bluetooth interface 780, RF interfaces 790, or the like. As illustrated, the above modules may communicate via an internal communication mechanism.

Typically, computing device 700 may include one or more processors 710. Such processors 710 may also be termed application processors, and may include a processor core, a video/graphics core, and other cores. Processors 710 may be a processor from Apple (S1), Intel (Quark SE), NVidia (Tegra K1, X1), Marvell (Armada), Qualcomm (Snapdragon), Samsung, TI (OMAP), or the like. In various embodiments, the processor core may be an Intel processor, an ARM Holdings processor such as the Cortex-A, -M, -R or ARM series processors, or the like. Other processing capability may include audio processors, interface controllers, and the like. It is contemplated that other existing and/or later-developed processors may be used in various embodiments of the present invention, including processors having greater processing capability (e.g. Intel Core).

In various embodiments, memory 720 may include different types of memory (including memory controllers), such as flash memory (e.g. NOR, NAND), pseudo SRAM, DDR SDRAM, or the like. Memory 720 may be fixed within computing device 700 or removable (e.g. SD, SDHC, MMC, MINI SD, MICRO SD, CF, SIM). The above are examples of computer readable tangible media that may be used to store embodiments of the present invention, such as computer-executable software code (e.g. firmware, application programs), application data, operating system data or the like. It is contemplated that other existing and/or later-developed memory and memory technology may be used in various embodiments of the present invention.

In various embodiments, display 730 may be based upon a variety of current or later display technology including displays having touch-response, (e.g. resistive displays, capacitive displays, optical sensor displays, electromagnetic resonance, or the like). Any later-developed or conventional output display technology may be used for the output display, such as TFT-LCD, OLED, Plasma, trans-reflective (Pixel Qi), electronic ink (e.g. electrophoretic, electrowetting, interferometric modulating). In various embodiments, the resolution of such displays and the resolution of such touch sensors may be set based upon engineering or non-engineering factors (e.g. sales, marketing). In some embodiments of the present invention, a display output port, such as an HDMI-based port or DVI-based port may also be included.

In some embodiments of the present invention, water analysis module 750 may include multiple UV-LED light sources, each having unique UV light output frequencies, and one or more optical sensors. In various embodiment, UV-LED light sources have a relative narrow output peak (e.g. on the order of 20 nm), and are embodied as UV-LEDs currently being developed by the current assignee of the present application. The narrow output peaks allows embodiments of the present invention to differentiate between different types of contaminants and impurities. For example 210 nm to 250 nm range can detect Nitrites (NO2) and Nitrates (NO3), 250 nm to 380 nm can detect Total Organic Carbon (TOC), Dissolved Organic Carbon (DOC), Chemical Oxygen Demand (COD), Biochemical Oxygen Demand (BOD), Color (Hazen), Assimilable Organic Carbon (AOC), 240 nm and 300 nm range can detect Ozone, 360 to 395 nm can detect Benzene, Toluene and Xylene (BTX) and Turbidity (NTU) and the like. In some embodiments, the inventors envision utilizing Total Dissolved Solids (TDS) sensors to determine chemical impurities within the water, (e.g. chlorine, lead, arsenic, other metals, organic compounds, salts, etc.). In some embodiments, additional sensors, such as pH sensors and thermometers may also be included, as water quality, turbidity, and the like may be dependent upon pH, temperature, and the like. In some embodiments, a single water analysis module 750 may only analyze purified water, or may only analyze incoming and purified water. In other embodiments, two water analysis modules 750 are provided, one for incoming water, and one for purified (treated) water.

In various embodiments, mechanical/chemical purification module 760 may include one or more porous membranes to filter-out contaminants particles suspended in the water. Additionally, module 760 may include any number of chemicals to reduce chemical contaminants in the water. In some examples, module 760 may include an activated charcoal filter to reduce chlorine and TOC (total organic carbon), DOC (dissolved organic carbon), COD (chemical oxygen demand), TOC, DOC and COD and the like. In various embodiments, incoming water is treated with module 760 prior to treatment with UV module 770.

In various embodiments, UV module 770 may be expose the water to different ranges of UV light to destroy different types of pathogens. For example, UV light in the 214 nm range is used to destroy MS2 coliphage, UV light in the 265 nm range is used to destroy *B. subtilis* and the like. In some embodiments, UV module 770 may also include embodiments of UV-LEDs under development by the current assignee. Such embodiments may directly target the pathogens determined in water analysis module 750 on the incoming water. For example, if only *B. subtilis* is detected in module 750, only UV-LEDs having an output range of about 260 nm to about 270 nm can be activated, to attack the *B. subtilis*. In other embodiments, a broad-band UV light source, e.g. medium pressure UV bulb may also be used, to purify the water, regardless of whether any pathogens are detected.

In some embodiments, a photo detector, such as a photodiode, or a PMT (photomultiplier), or a spectrometer, can be used in the system to monitor optical signal generated by the UV-LED when transmitted through the water.

In some embodiments, GPS receiving capability may also be included in various embodiments of the present invention, however is not required. The GPS functionality may provide the remote server with the geographic location of device 700.

FIG. 4 is representative of one computing device 700 capable of embodying the present invention. It will be readily apparent to one of ordinary skill in the art that many other hardware and software configurations are suitable for use with the present invention. Embodiments of the present invention may include at least some but need not include all of the functional blocks illustrated in FIG. 4. Further, it should be understood that multiple functional blocks may be embodied into a single physical package or device, and various functional blocks may be divided and be performed among separate physical packages or devices.

Further embodiments can be envisioned to one of ordinary skill in the art after reading this disclosure. For example, device 700 may be powered by any number of sources 800 including: AC from a wall outlet, solar-derived power, battery, manual crank or the like.

Figure 5:
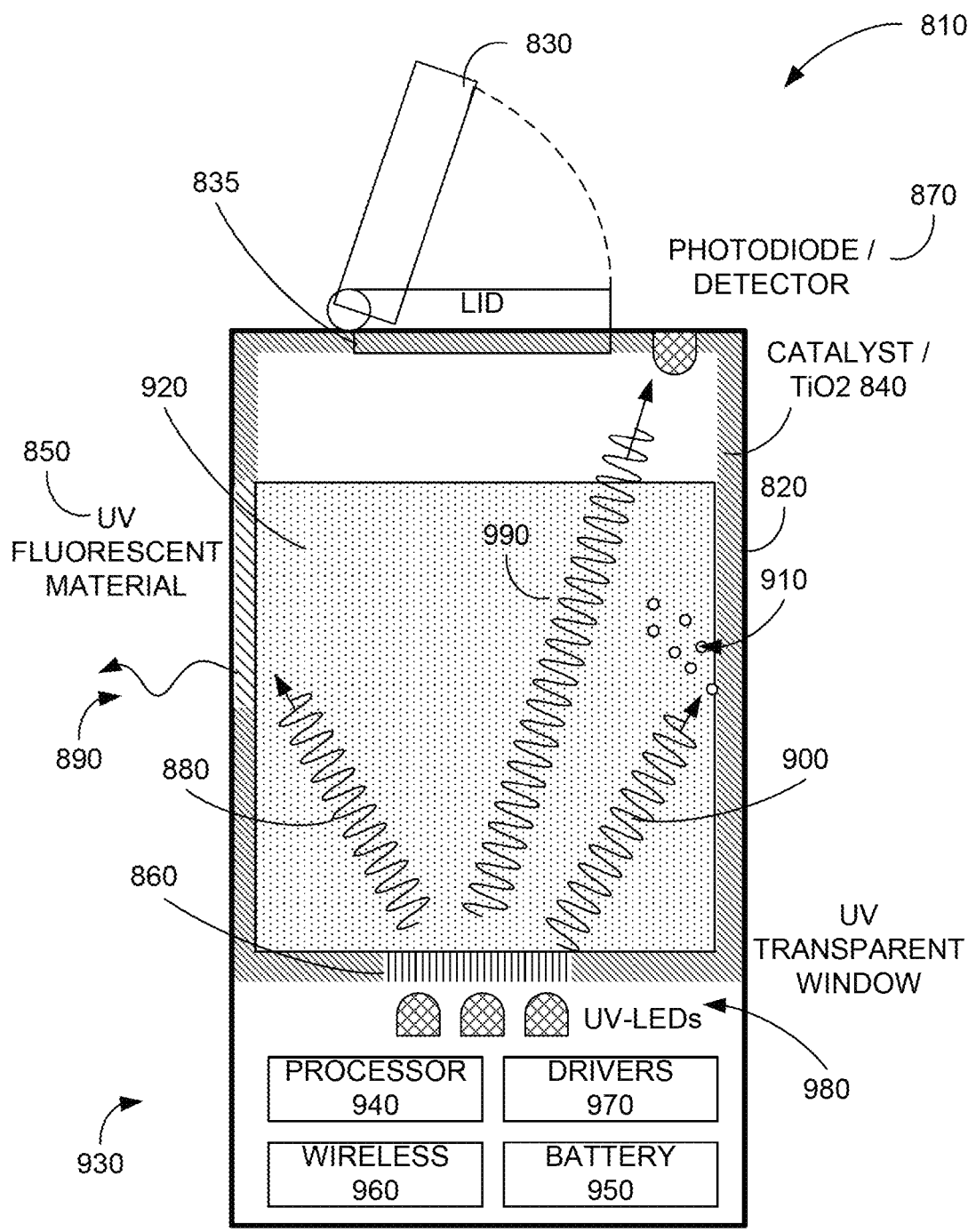
FIG. 5 illustrates cross-section of various embodiments of the present invention.

FIG. 5 illustrates an example of another embodiment of the present invention. In this example, a portable water bottle 810 is illustrated. Water bottle 810 includes an external housing having an opening 830, and an inner watertight housing 840. External housing may be a metal or metal alloy, glass, a translucent material, or other UV blocking material. The translucent material may also be a relatively clear plastic that has no or reduced degradation or reduced leeching of chemicals (e.g. BPA) into the water after being exposed to UV light, such as a Cyclic Olefin Copolymer (COC), a Cyclic Olefin Polymer (COP), a copolyester (e.g. Eastman Tritan™). In some embodiments, opening 830 may include a filter 835 for incoming water (as discussed in step 340, above). In various examples, as mentioned above, inner housing 840 may include a coating of a catalyst, such as $TiO_2$, or the like. The inner housing 840 may include a UV fluorescent material region 850, a UV transmissive region 860 (e.g. a UV transparent window, quartz, sapphire), a photo detector 870. In various embodiments, electronic components are disposed in a bottom portion 930 of water bottle 810. As was discussed above, various components may be provided, such as a processor 940, a power supply 950, a wired or wireless communication interface 960, LED drivers 970, and one or more UV-LEDs 980. In various embodiments, UV-LEDs 980 may include UV-A and/or UV-B LEDs or the like.

In various embodiments, as illustrated, in response to UV illumination 880, UV fluorescent material 850 provides visible light 890, which can be seen by a user. In some embodiments, material 850 may be in the shape of a logo, pattern, special design, or the like. The design would appear to glow when UV illumination 880 was present. As is illustrated, when UV illumination 900 directly strikes the inner surface of inner watertight housing 840, the direct illumination of UV illumination 900 will reduce, retard or prevent growth of molds, bacteria, or other pathogens upon the surface (e.g. glass, plastic, metal, etc.) of inner watertight housing 840. Additionally, in embodiments where a UV reactive coating is used (e.g. $TiO_2$), in response to UV illumination 900, the catalyst on inner housing 840 generates reactive oxygen species 910 within the liquid (e.g. water) 920. In various embodiments, the reactive oxygen species 910 may also reduce, retard or prevent growth of molds, bacteria, or other pathogens upon the surface of inner watertight housing 840. Additionally, as illustrated, UV or white light illumination 990 passes through liquid 920 and strikes photo detector (photo diode or spectrometer) 870. In various embodiments discussed above, the intensity of light indicates the clarity or turbidity of liquid 920. In some embodiments, various types of optical properties may be measured, such as optical transmission, optical absorption, optical reflectance, and optical fluorescence, and the like. Depending upon the intensity of detected light, the time for the UV sanitizing process may be modified (e.g. increased or decreased); the intensity of the UV LEDs may be modified; the UV sanitizing process may be aborted; and the like. In some embodiments, other types of sensors may be used to measure turbidity, such as a total suspended solids (TSS) meter, or the like.

In various embodiments, water bottle 810 may transmit the turbidity data, the UV sanitization parameters, and the like through wireless interface 960 to a remote destination. For example, the data may be sent to a third-party remote server; to a user's smart device or home computer; or the like.

In other embodiments, combinations or sub-combinations of the above disclosed invention can be advantageously made. For example, in FIG. 5, one or more UV wave guides may extend from the bottom surface of inner housing 840 into liquid 920. Such embodiments could increase the diffusion of UV light within inner housing 840. In another embodiment, the filter in the filtration process may include $TiO_2$ material inside, where upon water will flow through the filter and be exposed to the surface of the $TiO_2$ material ($TiO_2$ nano particle, thin film, micro sphere, powder, etc.) UV light may be optionally delivered to the $TiO_2$ material located inside the filter via light guiding technology, such as optical fiber or optical light guide blades. Such embodiments will increase the surface area of the $TiO_2$ material exposed to the liquid, thus the oxidation capability will increase. The block diagrams of the architecture and flow charts are grouped for ease of understanding. However it should be understood that combinations of blocks, additions of new blocks, re-arrangement of blocks, and the like are contemplated in alternative embodiments of the present invention.

Figure 6:
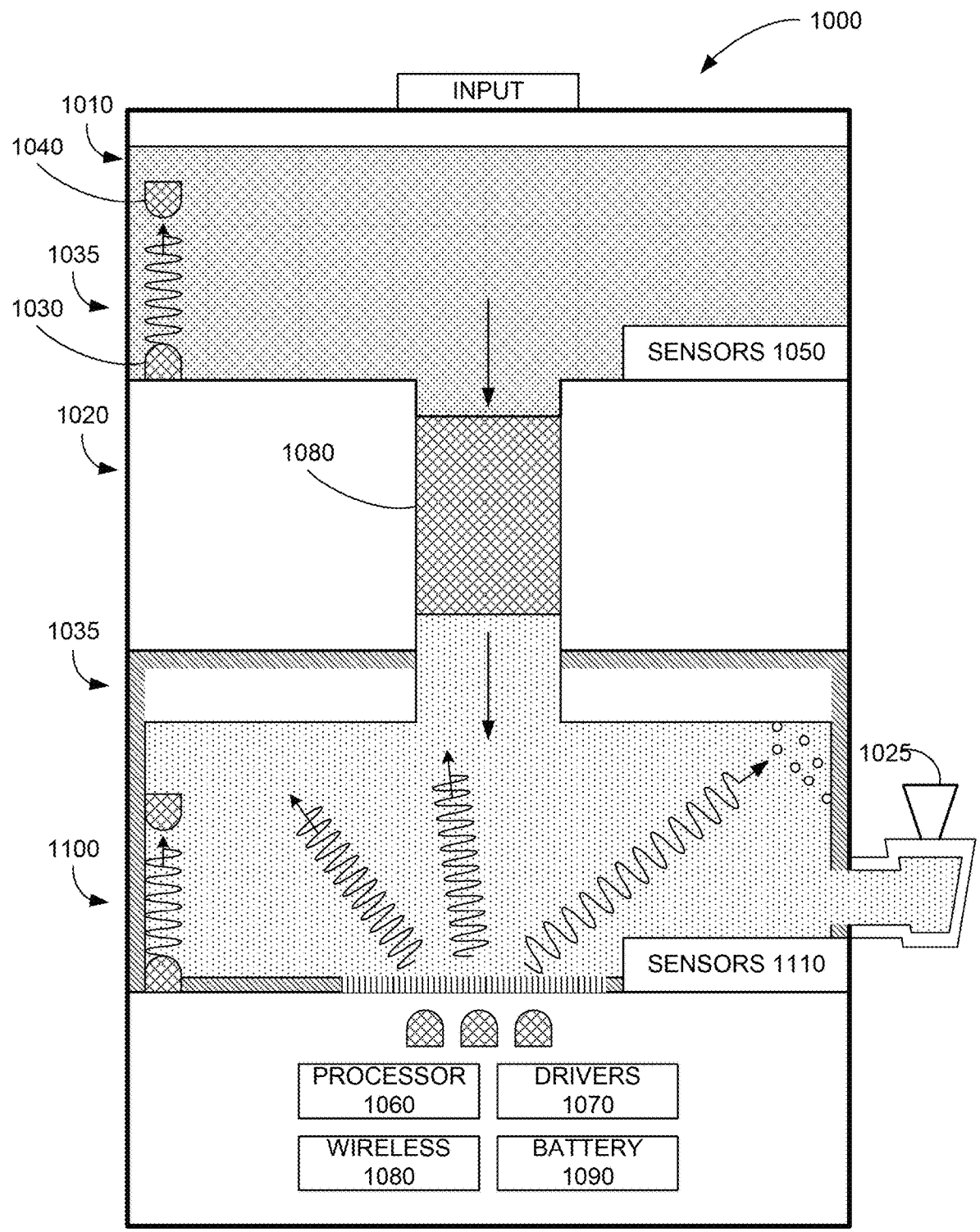
FIG. 6 illustrates an example of embodiments of the present invention described in the flowcharts above.

FIG. 6 illustrates an example of embodiments of the present invention described in the flowcharts above. In this example, a device 1000 is illustrated. Device 1000 includes an input portion 1010 for receiving input liquids (e.g. water), a treatment portion 1020 for treating liquids and an output portion 1035 for storing treated liquids. In some embodiments, device 1000 may be embodied as a table-top water dispenser with a spigot 1025; a water pitcher; a portable water bottle; a water tank (e.g. roof top), an water treatment unit (e.g. in a garage), and a treated water tank (e.g. under the sink), each physically separated from each other; and the like. In the example in FIG. 6, a single set of: processor 1060, UV LED drivers 1070, wireless 1080 and battery 1090 is used to operate device 1000. In other embodiments where input portion 1010 and output portion 1035 are remote from each other, each portion may include its own power, UV LED drivers, processor or controller, and the like.

In various embodiments, input portion 1010 includes liquid analysis hardware, such as a UV analysis module 1035. As discussed above (FIG. 2A, step 310; FIG. 4, water analysis module 750), this may include one or more UV LEDs 1030 with unique UV emission peaks that illuminate the water, in conjunction with one or more optical sensors 1040. These may be used to detect the reflective or fluorescence UV response of impurities (e.g. cryptosporidium, giardia, legionella, coliform, viruses, Nitrites ($NO_2$) and Nitrates ($NO_3$), Total Organic Carbon (TOC), Dissolved Organic Carbon (DOC), Chemical Oxygen Demand (COD), Biochemical Oxygen Demand (BOD), Color (Hazen), Assimilable Organic Carbon (AOC), Ozone, Benzene, Toluene and Xylene (BTX) and Turbidity (NTU) and the like. The distance between UV LED 1030 and sensor 1040 is known as the optical path length. Additionally, input portion 1010 may include additional sensors 1050, such as a TDS sensor for determining chemical impurities (e.g. chlorine, lead, arsenic, metals, organic compounds, salts, etc.) a pH sensor, a thermometer, and the like.

In various embodiments, device 1000 includes a treatment portion 1020. As discussed above (in FIG. 2A, steps 340 and 350, and in FIG. 4, module 760 and UV module 770). Treatment portion may include a chemical and or mechanical filter 1080 that reduces chemicals dissolved and particles suspended in the water. This may include a user-replaceable filter or filter cartridge that reduces: chlorine, metals, and TOC (total organic carbon), DOC (dissolved organic carbon), COD (chemical oxygen demand), salts and the like from the water. In some embodiments, one or more buffering chemicals may also be provided. Additionally, embodiments may include one or more UV LEDS 1090 that provide UV light to destroy different types of pathogens in the water. For example, UV light may destroy MS2 coliphage, *B. subtilis*, viruses, pathogens and the like. In other embodiments, the UV LEDS 1090 may be disposed within output portion 1035.

In various embodiments, output portion 1035 includes treated liquid analysis hardware, such as a UV analysis module 1100, additional sensors 1110 (e.g. a TDS sensor, a pH sensor, thermometer), and the like. As discussed above in FIG. 4, in some embodiments, two water analysis modules 750 are provided, one for incoming water, and one for purified (treated) water. In various embodiments, the capability of the treated liquid analysis hardware may be the same or different from the input liquid analysis hardware, described above.

As described in step 380, in FIG. 2B, based upon the analysis of the treated water, the device may determine whether the water is safe for consumption, and then the user decides whether she will consume the water or not. Additionally, as described in step 395, in FIG. 2B, based upon the analysis of the input liquid and the analysis of the treated liquid, a determination can be made as to whether the treatment portion 1020 is still effective. The inventors are aware that chemical and or mechanical filters often become ineffective after use, e.g. filters become clogged, chemicals become exhausted, and the like. Accordingly, based upon the change in water quality, the device may determine that the filters should be changed, and the user decides whether to change the filter or not.

Figure 7A:
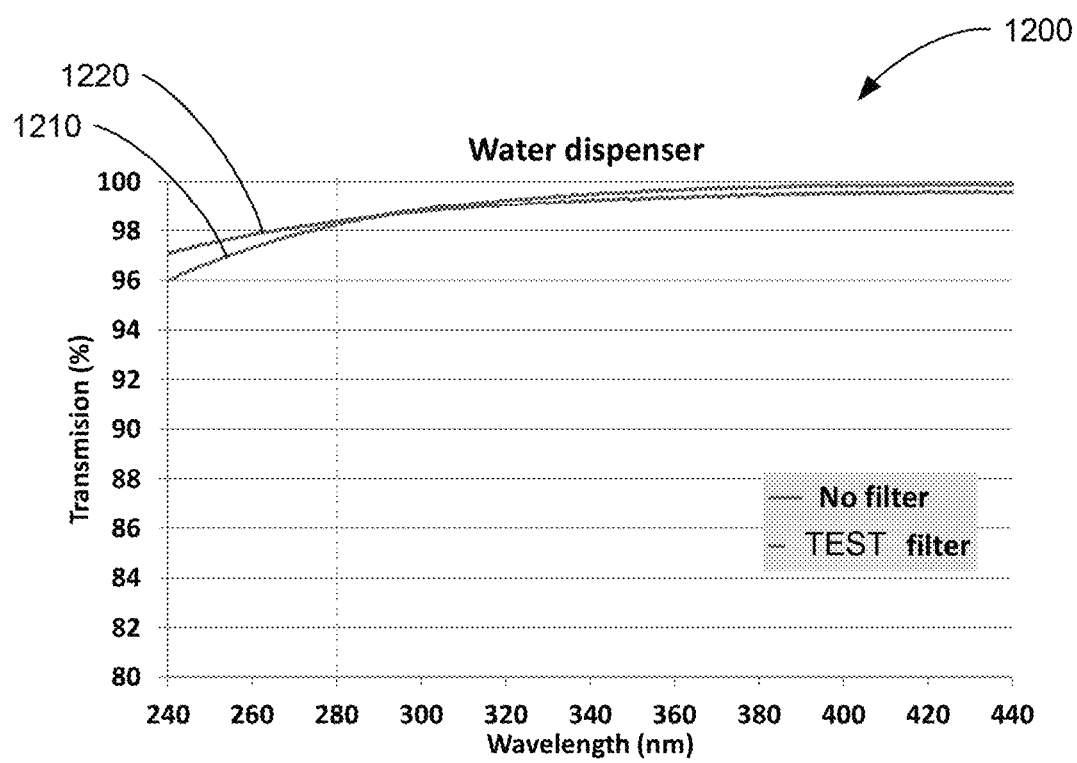
FIGS. 7A-7B illustrate transmission plots according to various embodiments of the present invention.
Figure 7B:
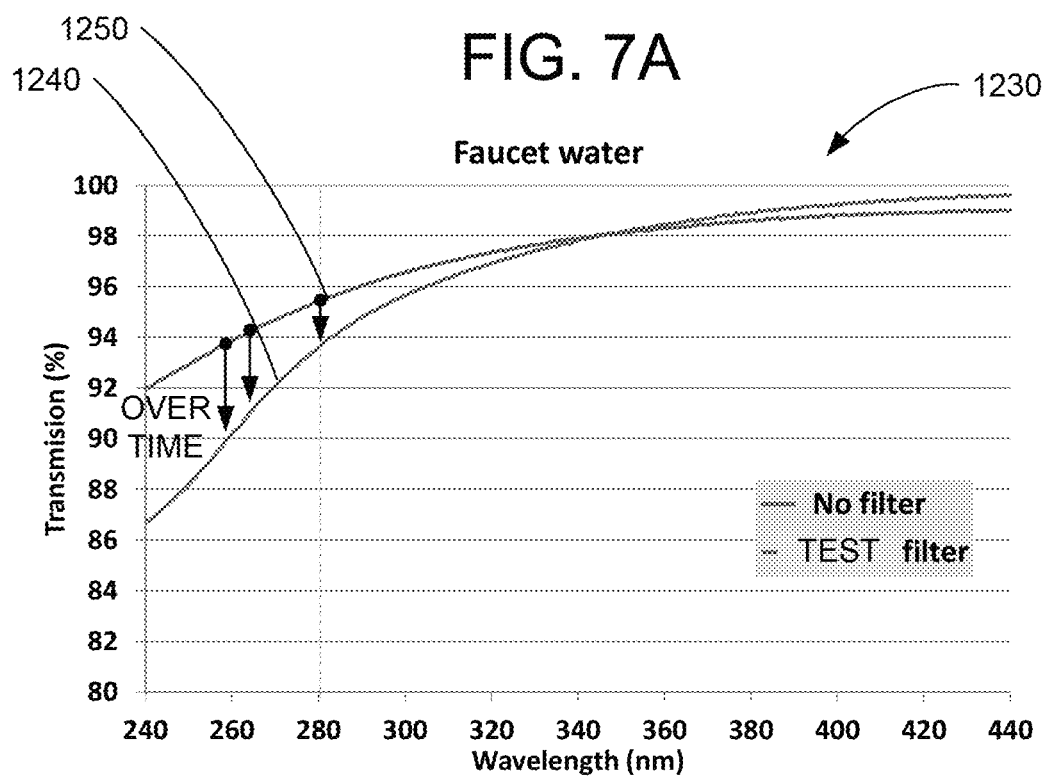

FIGS. 7A-7B illustrate transmission plots according to various embodiments of the present invention. More specifically, FIGS. 7A-7B illustrate transmission of UV light before and after commercial filtration plotted against UV wavelength. In the plot 1200, water was drawn from a commercial water dispenser and subject to various frequencies of UV light, as was described above. In the plot 1230, water was drawn from a municipal water supply and subject to various frequencies of UV light, as was described above. The amount of transmitted UV light is indicated as a percentage normalized with respect to pure, deionized water. In other words, UV transmission via deionized water is considered 100% transmission. For sake of convenience, transmission percentage is used herein and it should be recognized that adsorption percentage could also be used herein, as transmission and adsorption percentages are mathematically related.

In FIG. 7A, plot 1210 illustrates the transmission of water dispenser water prior to filtering, with respect to wavelength, and plot 1220 illustrates the transmission of water after filtering, with respect to wavelength. As the inventors have discovered, after being filtered, the UV transmission of the water increases, especially at shorter wavelengths, e.g. 240 nm. In FIG. 7B, plot 1240 illustrates the transmission of municipal tap water prior to filtering, with respect to wavelength, and plot 1250 illustrates the transmission of the tap water after filtering, with respect to wavelength. As the inventors have discovered, after being filtered, the UV transmission of the tap water is pronounced, especially at shorter wavelengths, e.g. 240 nm.

The inventors have determined that power consumption of UV-LEDs is often related to UV wavelength. In particular, shorter wavelength UV LEDs (e.g. peak of about 240 nm) often consume more power than longer wavelength UV LEDs (e.g. about 280 nm). Accordingly, in embodiments where power is limited, e.g. battery, solar power, crank power, etc. a UV-LED having a peak wavelength of about 280 nm can be used to determine whether the liquid has been effectively filtered, or not. This approximate peak UV wavelength may also be used in embodiments where low voltage power is supplied or where lower cost UV LEDs are desirable. In various embodiments, UV-LEDs may have a UV range within about 270 nm to about 290 nm; within a range of about 260 nm to about 280 nm; or the like.

As can be seen in FIG. 7B, depending upon the frequencies of UV light provided, a difference between filtered and un-filtered water can be determined. It is envisioned that when a filter is new, the user will determine water baselines (at one or more UV wavelengths), such as shown in plot 1240 and 1250. As time passes, and more water is treated, it is expected that the transmission of UV light will decrease, and plot 1250 will move towards plot 1240. In various embodiments, if the UV transmissions become closer, e.g. with a few percentage points, of plot 1240, the water device will indicate to the user that it is time to change the water filter(s).

Figure 8:
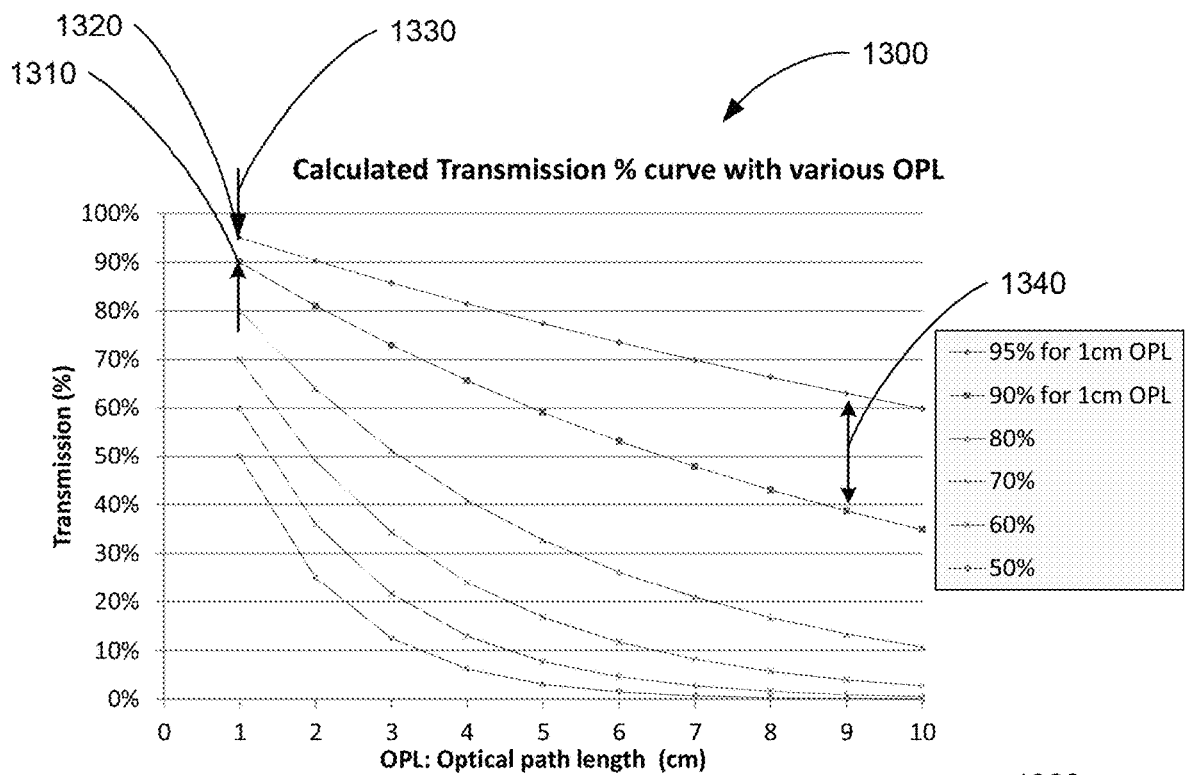
FIG. 8 illustrates transmission plots according to various embodiments of the present invention.

FIG. 8 illustrates transmission plots according to various embodiments of the present invention. More specifically, FIG. 8 illustrates transmission of UV light through different water samples plotted against different optical path lengths. In the 1300, water samples having different transmission percentages at 1 cm optical path length are shown, e.g. 95%, 90%, 80%, etc. As can be seen, as the optical path length increases, generally, the differences between the transmission percentages of the water samples becomes more readily apparent. For example, when using a 1 cm OPL, a difference 1330 between a first sample 1310 (90% transmission at 1 cm) and a second sample 1320 (95% transmission at 1 cm) water is only 5%, however when using a 9 cm optical path length, for example, a difference 1340 between first sample 1310 (~63% transmission at 9 cm) and a second sample 1320 (~39% transmission at 1 cm) water is about 24%. Accordingly, in embodiments of the present invention, longer optical path lengths are used over shorter optical path lengths, to more easily determine differences in water transmission percentages.

Figure 9:
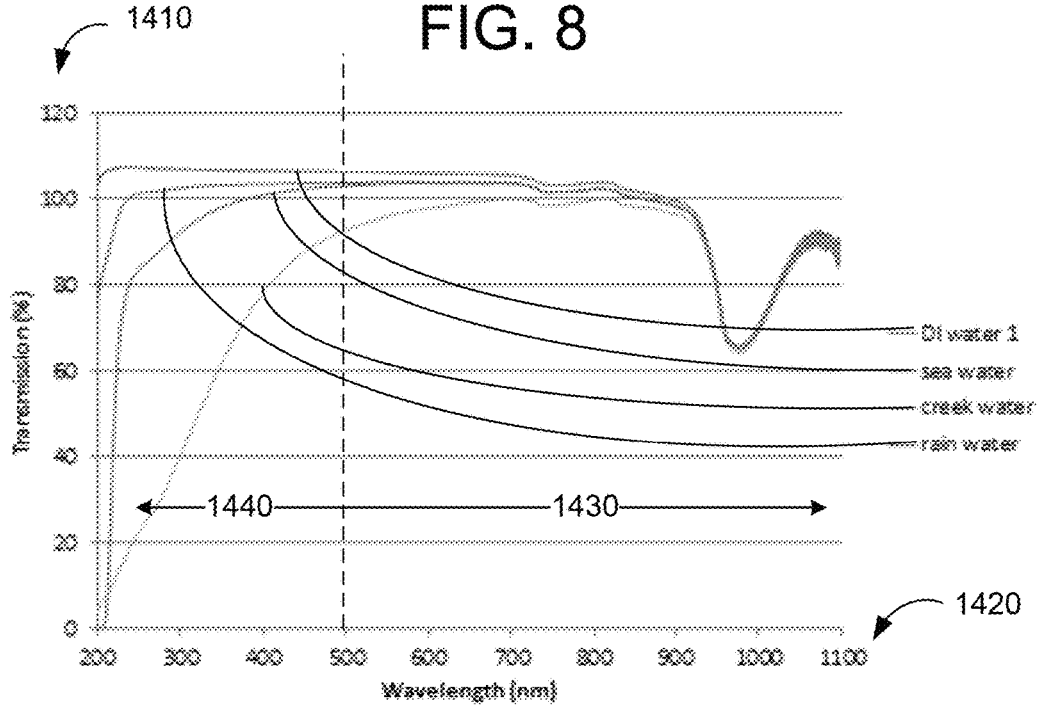
FIG. 9 illustrates transmission plots according to various embodiments of the present invention.

FIG. 9 illustrates transmission plots according to various embodiments of the present invention. As can be seen in the plot 1400 in FIG. 9, different types of water tested can be characterized by transmission percentage 1410 versus wavelength 1420. As can be seen in the experimental results, the inventors prove how water having higher levels of impurities, e.g. salts, contaminants, etc. have very similar transmission percentages within a range 1430 including visible light within a range of about 500 nm (blue) to about 750 nm (red) and higher (infrared). Further, the inventors prove how the differences between different water samples are much more discernable when using light within the ultraviolet range 1440.

Figure 10:
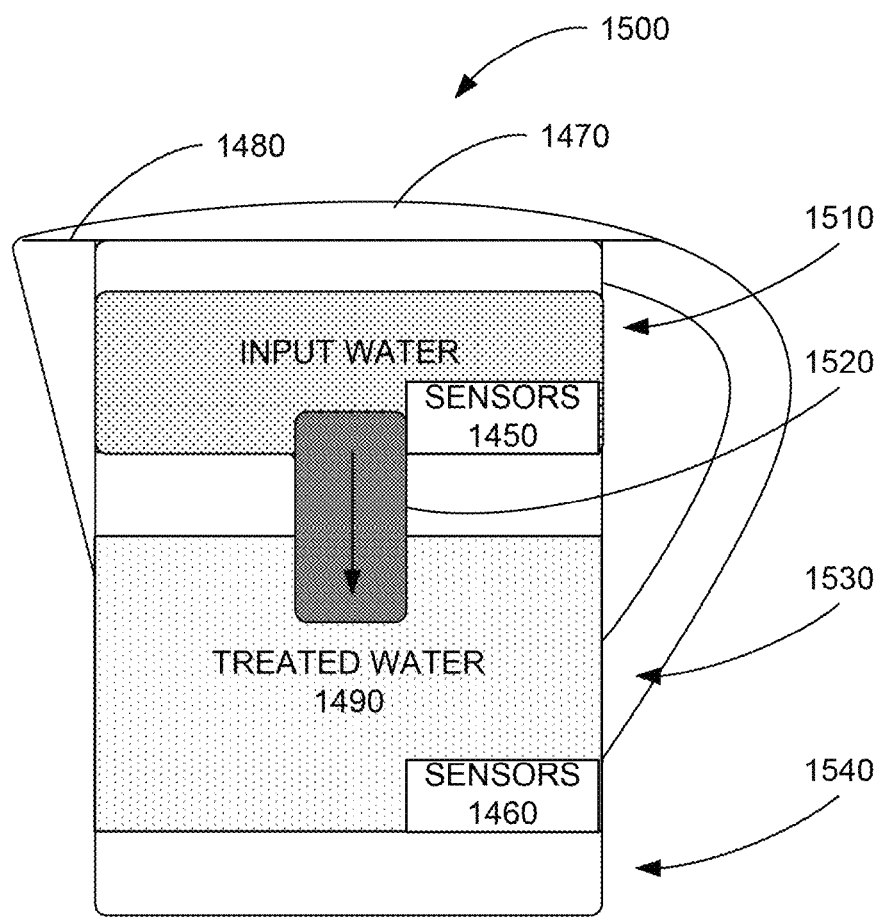
FIG. 10 illustrates an embodiment of the present invention.

FIG. 10 illustrates an embodiment of the present invention. Water pitcher 1500 includes an upper portion 1510 for incoming water, a filter portion 1520, a storage portion 1530, and a base portion 1540. As with regards to FIG. 6, for example, sensors 1550 and/or 1560 are provided to test transmission (absorption, opacity, etc.) of water. In various embodiments, filter portion 1520 may include a mechanical and chemical filtering cartridge, as well as UV treatment. In some embodiments, UV treatment is provided within storage portion 1530. In various embodiments, water or other liquid is passed through filter portion 1520 due to gravity, however, in other embodiments, upper portion 1510 may be pressurized. As was discussed above, processors, memory, wireless communication means, and the like may be provided within base portion 1540 and coupled to sensors 1550 and/or 1560. In some embodiments, storage portion 1530 may be relatively transparent and formed of UV degradation resistant plastics, described above, glass, metal, and may have a UV reactive coating (e.g. TiO2) as also described above. In some embodiments, upper portion 1510 may be transparent to opaque, according to desired engineering or aesthetic considerations. In the example in FIG. 10, water pitcher 1500 may include a cover 1470 that may be opened by the user for filling water pitcher 1500 with input water, and a spout 1480 that may be used for outputting treated water 1490.

In other embodiments, combinations or sub-combinations of the above disclosed invention can be advantageously made. For example, in FIGS. 5, 6 and 10, one or more UV wave guides may extend from the bottom surface. Such embodiments could increase the diffusion of UV light. In another embodiment, the filter in the filtration process may include TiO2 material inside, where upon water will flow through the filter and be exposed to the surface of the TiO2 material (TiO2 nano particle, thin film, micro sphere, powder, etc.) UV light may be optionally delivered to the TiO2 material located inside the filter via light guiding technology, such as optical fiber or optical light guide blades. Such embodiments will increase the surface area of the TiO2 material exposed to the liquid, thus the oxidation capability will increase.

In yet another embodiments, in FIG. 2A, a user may be provided with a base-line liquid sample (e.g. dionized water, Fiji-brand water, etc.) Upon initial operation, the user provides this water to the water treatment device, and the water treatment device tests the provided water for impurities, etc. Subsequently, when the user inputs tap water, or other water to the water treatment device, an indication of impurities, transmission, absorption, and the like are normalized with respect to the base-line liquid sample. For example, in steps 310 and or 360, the transmission (or absorption) of the dionized water is normalized to 100%. In other embodiments, the water treatment device may be calibrated, upon first use, however in other embodiments, the water treatment device may be calibrated on demand. The block diagrams of the architecture and flow charts are grouped for ease of understanding. However it should be understood that combinations of blocks, additions of new blocks, re-arrangement of blocks, and the like are contemplated in alternative embodiments of the present invention.

In light of the present disclosure, additional dependent claims to the independent claims are supported. For example, the following claims are supported (referencing claim recited within the claims section, below):

21. The method of claim 2 wherein the predetermined standards data is associated with an amount of impurities suspended or mixed within the treated liquid.

22. The method of claim 2 wherein the predetermined standards data is associated with an amount of impurities dissolved within the treated liquid, wherein the impurities are selected from a group consisting of: organic material, salts, chemicals, fertilizers, metals, pathogens, pesticides, petroleum, and minerals.

23. The method of claim 2 wherein the predetermined standards data are associated with standards selected from a group consisting of: Total Organic Carbon (TOC), Dissolved Organic Carbon (DOC) and Biological Oxygen Demand (BOD).

24. The method of claim 2 further comprising:
determining with a sensor, an amount of dissolved solids within the treated liquid;
determining with a processor, whether the amount of dissolved solids does not exceed predetermined dissolved solids standards data; and
wherein the determining with the processor, the safe signal, is also in response to the amount of dissolved solids not exceeding the predetermined dissolved standards data.

25. The method of claim 2 further comprising:
determining with a pH sensor, a pH of the treated liquid;
determining with a processor, whether the pH meeting a predetermined pH range; and
wherein the determining with the processor, the safe signal, is also in response to the pH meeting the predetermined pH range.

26. The method of claim 1 wherein the treating with the liquid treatment portion of the liquid treatment device comprises passing the input liquid through one or more liquid treatment cartridges to form the treated liquid.

27. The method of claim 1 wherein the treating with the liquid treatment portion of the liquid treatment device, the input liquid comprises applying UV light to the input liquid to sanitize and form the treated liquid.

28. The method of claim 27 further comprising:
holding the treated liquid in an output portion of the liquid treatment device, wherein the output portion comprises a plurality of sidewalls; and
wherein applying the UV light to the input liquid comprises applying the UV light to the plurality of sidewalls of the output portion to thereby sanitize the plurality of sidewalls of the output portion.

29. The method of claim 28 further comprising:
wherein applying the UV light to the input liquid further comprises illuminating a sidewall of the output portion to thereby cause the sidewall to fluoresce.

30. The storage container of claim 12 wherein the predetermined criteria is determined in response to an amount of impurities dissolved within the filtered liquid, wherein the impurities are selected from a group consisting of: organic material, salts, chemicals, fertilizers, metals, pathogens, pesticides, petroleum, and minerals.

31. The storage container of claim 12 wherein the predetermined criteria is determined in response to one or more of an amount of: Total Organic Carbon (TOC), Dissolved Organic Carbon (DOC) or Biological Oxygen Demand (BOD) within the filtered liquid.

32. The storage container of claim 21 further comprising:
a sensor coupled to the processor, wherein the sensor detects an amount of dissolved solids within the treated liquid; and
wherein the processor is configured to determine whether the amount of dissolved solids does not exceed predetermined dissolved solids criteria; and
wherein the processor is configured to determine the safe signal also in response to the amount of dissolved solids not exceeding the predetermined dissolved standards data.

33. The storage container of claim 11 further comprising:
a pH sensor coupled to the processor, wherein the pH sensor is configured to determine a pH of the treated liquid; and
wherein the processor is configured to determine whether the pH meets a predetermined pH range; and
wherein the processor is configured to determine the safe signal also in response to the pH meeting the predetermined pH range.

34. The storage container of claim 12
wherein the processor is configured to determine a safety metric for the filtered liquid in response to the amount of dissolved solids within the treated liquid and to the absorption percentage or the transmission percentage; and
wherein the storage container further comprises a wireless communication portion coupled to the processor, wherein the wireless communication portion is configured to provide the safety metric for the filtered liquid to a remote device.

35. The storage container of claim 11 wherein the liquid comprises water.

36. The storage container of claim 11 further comprising a plurality of UV-LEDs configured to provide UV-C light to the filtered liquid within the storage portion to thereby sanitize the filtered liquid.

37. The storage container of claim 36 wherein storage portion comprises a plurality of side walls; and
wherein the plurality of UV-LEDs are also configured to provide UV-C light to the plurality of side walls to thereby sanitize the storage portion.

The specification and drawings are, accordingly, to be regarded in an illustrative rather than a restrictive sense. It will, however, be evident that various modifications and changes may be made thereunto without departing from the broader spirit and scope of the invention as set forth in the claims.

We claim:

1. A method for a hand-held liquid treatment device having an upper portion, a lower portion and a treatment region comprises:
 receiving in the upper portion a source liquid to be treated;
 receiving the source liquid in a cartridge in the treatment region;
 filtering the source liquid in the cartridge to reduce particulate impurities from the source liquid;
 disinfecting with a first UV LED the source liquid with UV light in the cartridge to reduce biological impurities from the source liquid, wherein after the filtering step and the disinfecting step, the source liquid becomes treated liquid;
 receiving the treated liquid in the lower portion;
 determining first UV light optical analysis data associated with the treated liquid;
 determining with a processor, whether the first UV light optical analysis data exceeds predetermined human consumption standards data;
 determining with the processor, a safe signal, in response to the first UV optical analysis data exceeding the predetermined human consumption standards; and
 outputting a first visual indication to a user that the treated liquid is safe for human consumption, in response to the safe signal.

2. The method of claim 1 further comprising:
 determining second UV light optical analysis data an input portion of the liquid treatment device;
 storing in a memory, the second UV light optical analysis data; and
 determining a difference between the first UV light optical analysis data to the second UV light optical analysis data.

3. The method of claim 2 further comprising:
 determining whether the difference is less than a threshold amount; and
 outputting a second visual indication to the user that the cartridge should be changed in response to the difference being determined to be less than the threshold amount.

4. The method of claim 3 further comprising outputting with a wireless communication portion, an indication to a remote device that the cartridge should be changed by the user, in response to the difference being determined to be less than the threshold amount.

5. The method of claim 1 further comprising outputting with a wireless communication portion, the first optical analysis data to a remote device.

6. The method of claim 5 wherein the remote device is selected from a group consisting of: a smart device, and a remote computer.

7. The method of claim 1 wherein the determining the first optical analysis data associated with the treated liquid comprises:
 outputting with a second UV LED, a first amount of UV light into the treated liquid;
 sensing with one or more UV detectors, a second amount of UV light output from the treated liquid in response to the first amount of UV light output into the treated liquid; and
 determining with the processor, the first optical analysis data in response to the first amount of UV light and the second amount of UV light.

8. The method of claim 7 wherein a distance between the second UV LED and the one or more UV detectors is within a range of 1 to 9 cm.

9. The method of claim 1 wherein disinfecting with the first UV LED, the source liquid with the UV light comprises applying with the first UV LED, the source liquid with the UV light to destroy pathogens selected from a group consisting of: MS2 coliphage, *B. subtilis*, and viruses from the source liquid.

10. The method of claim 1 wherein the input liquid is selected from a group consisting of: tap water and bottled water.

11. A hand-held liquid storage container comprising:
 an upper portion configured to receive a source liquid to be treated;
 a storage portion configured to store treated liquid;
 a treatment region coupled to the upper portion and to the storage portion, wherein the treatment region is configured to receive the source liquid from the upper portion and configured to provide the treated liquid to the storage portion, wherein the treatment region comprises a disinfecting portion including:
  a first UV LED configured to expose the source liquid to UV light to reduce biological impurities; and
  an activated charcoal filter, wherein the activated charcoal filter is configured to treat the source liquid and to output treated liquid;
 a first detector disposed within the storage portion, wherein the detector comprises:
  a second UV LED configured to provide UV light to the treated liquid stored within the storage portion;
  a UV light detector, optically coupled to the second UV LED and disposed an optical path length away from the second UV LED, wherein the UV light detector is configured to detect received UV light in response to the UV light provided by the second UV LED through a portion of the treated liquid; and
  a processor coupled to the second UV LED and UV light detector, wherein the processor is configured to determine a treated liquid absorption percentage or treated liquid transmission percentage in response to the UV light and the received UV light, wherein the processor is configured to determine a safe condition, in response to the treated liquid absorption percentage or the treated liquid transmission percentage respectively not exceeding or exceeding respective predetermined criteria.

12. The storage container of claim 11 further comprising:
 a wireless communication portion coupled to the processor, wherein the wireless communication portion is configured to provide an indication to a remote device that the disinfected liquid is safe for human consumption, in response to the safe condition, wherein the remote device is selected from a group consisting of: a smart device, and a remote computer.

13. The storage container of claim 12 wherein the wireless communication portion is configured to provide an indication to a remote device that the activated charcoal filter should be changed, in response to an absence of the safe signal.

14. The storage container of claim 13 wherein the wireless communication portion is selected from a group consisting of: Wi-Fi, Bluetooth or variant, Zigbee, Cellular, 4G, or the like.

15. The storage container of claim 11 wherein the disinfecting portion comprises a removable cartridge comprising the first UV LED and the activated charcoal filter.

16. The storage container of claim 11 wherein the first UV LED is configured to output the UV light within a frequency range of about 220 nm to about 450 nm.

17. The storage container of claim 11 wherein the optical path has a length within a range of about 1 cm to about 10 cm.

18. The storage container of claim 11 further comprising:
a second detector disposed within the upper portion, wherein the detector comprises:
a third UV LED configured to provide UV light to the source liquid stored within the upper portion; and
a second UV light detector, optically coupled to the third UV LED and disposed an optical path length away from the third UV LED, wherein the second UV light detector is configured to detect received UV light in response to the UV light provided by the third UV LED through a portion of the source liquid; and
wherein the processor is coupled to the third UV LED and the second UV light detector, wherein the processor is configured to determine a source liquid absorption percentage or source liquid transmission percentage in response to the UV light and the received UV light, and wherein the processor is configured to compare the source liquid absorption percentage to the treated liquid absorption percentage or to compare the source liquid transmission percentage to the treated liquid transmission percentage.

19. The storage container of claim 11 comprising a pitcher or bottle.

20. The storage container of claim 11 further comprising a base portion disposed below the storage portion, wherein the base portion comprises the processor.

* * * * *